United States Patent
Byun et al.

(10) Patent No.: US 10,217,980 B2
(45) Date of Patent: Feb. 26, 2019

(54) SECONDARY BATTERY

(71) Applicant: Samsung SDI Co., Ltd., Yongin-si, Gyeonggi-do (KR)

(72) Inventors: Sangwon Byun, Yongin-si (KR); Jeongwon Oh, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 470 days.

(21) Appl. No.: 15/093,330

(22) Filed: Apr. 7, 2016

(65) Prior Publication Data
US 2017/0047565 A1    Feb. 16, 2017

(30) Foreign Application Priority Data
Aug. 13, 2015  (KR) .................. 10-2015-0114634

(51) Int. Cl.
*H01M 2/12*  (2006.01)
*H01M 2/34*  (2006.01)
*H01M 2/30*  (2006.01)
*H01M 2/04*  (2006.01)

(52) U.S. Cl.
CPC .......... *H01M 2/1241* (2013.01); *H01M 2/30* (2013.01); *H01M 2/345* (2013.01); *H01M 2/0473* (2013.01); *H01M 2200/20* (2013.01)

(58) Field of Classification Search
None
See application file for complete search history.

(56) References Cited

U.S. PATENT DOCUMENTS

2010/0323234 A1*  12/2010  Kim ................. H01M 2/206
                                                429/158
2012/0328932 A1*  12/2012  Guen ............... H01M 2/024
                                                429/179

FOREIGN PATENT DOCUMENTS

| JP | 10-334883 A | 12/1998 |
| JP | 2000-090960 A | 3/2000 |
| JP | 2014-137891 A | 7/2014 |
| KR | 10-2010-0137904 A | 12/2010 |

* cited by examiner

*Primary Examiner* — Carmen V Lyles-Irving
(74) *Attorney, Agent, or Firm* — Lewis Roca Rothgerber Christie LLP

(57) ABSTRACT

A secondary battery according to one or more embodiments includes a case defining an inner space, an electrode assembly in the case, the electrode assembly including a first electrode plate, a second electrode plate, and a separator between the first and second electrode plates, a cap plate sealing the case and electrically connected to the first electrode plate of the electrode assembly, the cap plate including a safety vent, an electrode terminal part extending through the cap plate, and a connector having a first end electrically connected to the electrode terminal part and a second end electrically connected to the safety vent.

6 Claims, 5 Drawing Sheets

SECONDARY BATTERY

CROSS-REFERENCE TO RELATED APPLICATION

This application claims priority to, and the benefit of, Korean Patent Application No. 10-2015-0114634, filed on Aug. 13, 2015 in the Korean Intellectual Property Office (KIPO), the content of which is incorporated herein in its entirety by reference.

BACKGROUND

1. Field

Embodiments of the present invention relate to a secondary battery.

2. Description of the Related Art

In general, secondary batteries are designed to be chargeable and dischargeable, unlike primary batteries, which are not designed to be chargeable. A low-capacity battery, in which one battery cell is packaged in the form of a pack, may be used in portable small electronic devices, such as mobile phones and camcorders. A high-capacity battery, which includes several tens of battery cells connected to one another, may be used as a power source for driving motors of electric bicycles, electric scooters, hybrid vehicles, electric vehicles, and the like.

A secondary battery may be manufactured in various shapes, such as a prismatic shape, a cylindrical shape, and a pouch shape. An electrolyte and an electrode assembly are accommodated in a case, and a cap plate is installed on the case, thereby forming the secondary battery. The electrode assembly is formed by interposing a separator, which is an insulator, between a positive electrode plate and a negative electrode plate. The electrode assembly is connected to an electrode tab, or a positive terminal, which protrudes through the cap plate and is exposed to the outside of the case.

If the second battery has very high power consumption, or has too large of a charging current, the inner components of the battery cell may significantly increase in temperature, and may thus increase pressure within the battery cell, which may cause an explosion. Thus, a secondary battery that is capable of improving stability is desired.

SUMMARY

Aspects of embodiments of the present invention provide a secondary battery including a device for breaking current when an inner pressure of a battery cell increases due to overcurrent or overcharging that ruptures a safety vent.

According to one or more exemplary embodiments of the present invention, a secondary battery includes a case defining an inner space, an electrode assembly in the case, the electrode assembly including a first electrode plate, a second electrode plate, and a separator between the first and second electrode plates, a cap plate sealing the case and electrically connected to the first electrode plate of the electrode assembly, the cap plate including a safety vent, an electrode terminal part extending through the cap plate, and a connector having a first end electrically connected to the electrode terminal part and a second end electrically connected to the safety vent.

The secondary battery may further include a lead tab electrically connected to the electrode assembly, and electrically connecting the cap plate to the first electrode plate.

The lead tab may include a collection part contacting the first electrode plate, an extension part extending from an upper portion of the collection part, and a contact part at an end of the extension part.

The electrode terminal part may include a coupling terminal, an electrode terminal extending through the cap plate and through the coupling terminal, and electrically coupled to the coupling terminal, and a coupling plate electrically insulating the coupling terminal from the cap plate.

The secondary battery may further include an insulation member between the cap plate and the lead tab.

The cap plate may define a vent opening, the safety vent may be coupled to the cap plate at the vent opening to seal the vent opening, and the safety vent may be electrically connected to the cap plate.

The safety vent may include a fixed part fixed to the cap plate at the vent hole, a rupture part inside the fixed part and defining a notch, and a coupling part inside the rupture part, and electrically coupled to the second end of the connector.

The vent opening may be defined by a stepped surface of the cap plate, and the fixed part may be coupled to the stepped surface.

The secondary battery may further include a connection part connecting the fixed part to the rupture part, and the connection part may have a concave shape in which a lower surface of the connection part and the coupling part protrude inwardly toward the inside of the case.

The coupling part may have a thickness that is greater than thicknesses of the fixed part, the rupture part, and the connection part.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain principles of the present disclosure. In the drawings.

DETAILED DESCRIPTION

Figure 1:
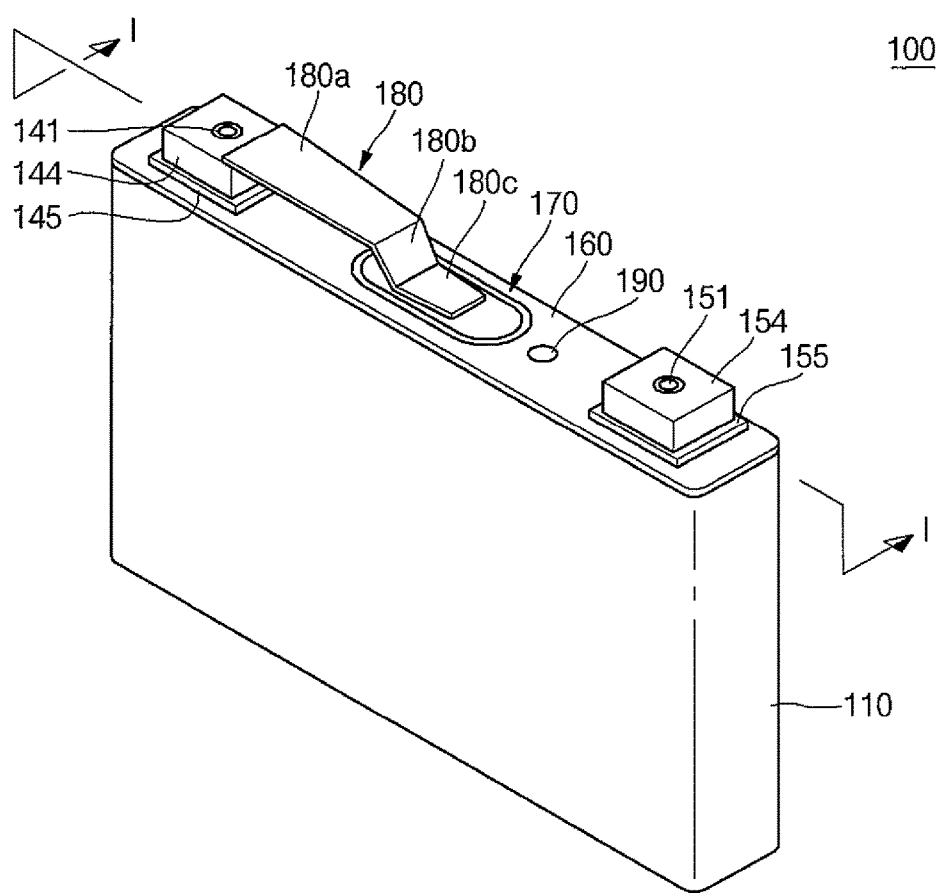
FIG. 1 illustrates a perspective view of a secondary battery according to one or more exemplary embodiments of the present invention.

Example embodiments of the present invention are described more fully hereinafter with reference to the accompanying drawings.

The present invention may, however, be embodied in many different forms and should not be construed as being limited to the embodiments set forth herein; rather, these embodiments are provided so that those skilled in the art may thoroughly understand the present invention. The exemplary embodiments are provided so that this disclosure will be thorough and complete, and will fully convey the scope of the present invention to those skilled in the art.

Also, in the figures, the dimensions of layers and regions may be exaggerated for clarity of illustration. Like reference numerals refer to like elements throughout. As used herein, the term "and/or" includes any and all combinations of one or more of the associated listed items. It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terms used herein are for illustrative purposes of the present invention and should not be construed to limit the meaning or the scope of the present invention The terminology used herein is for the purpose of describing particular embodiments and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, terms such as "first," "second," etc. are used to describe various members, components, regions, layers, and/or portions. However, it is to be understood that the members, components, regions, layers, and/or portions should not be defined by these terms. The terms do not mean a particular order, up and down, or relative superiority, and are used only for distinguishing one member, component, region, layer, or portion from another member, component, region, layer, or portion. Thus, a first member, component, region, layer, or portion which will be described may also refer to a second member, component, region, layer, or portion, without departing from the teaching of the present invention.

Spatially relative terms, such as "below", "beneath", "lower", "above", "upper" and the like, may be used herein for ease of description to describe one element or feature's relationship to another element(s) or feature(s) as illustrated in the figures. These spatially relative terms are intended for easy comprehension of the prevent invention according to various process states or usage states of the prevent invention, and thus, the present invention is not limited thereto. For example, an element or feature shown in the drawings is turned inside out, the element or feature described as the term "beneath" or "below" may change into the term "above" or "upper". Thus, the term "below" may encompass the term "above" or "below".

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 2:
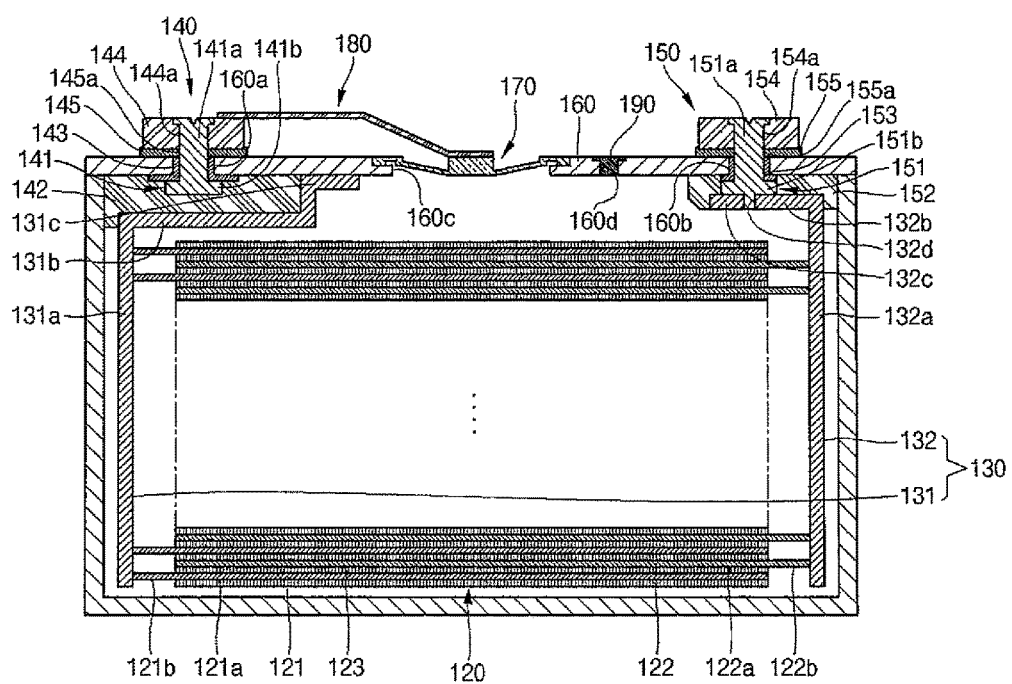
FIG. 2 illustrates a cross-sectional view of the secondary battery of FIG. 1.
Figure 3:
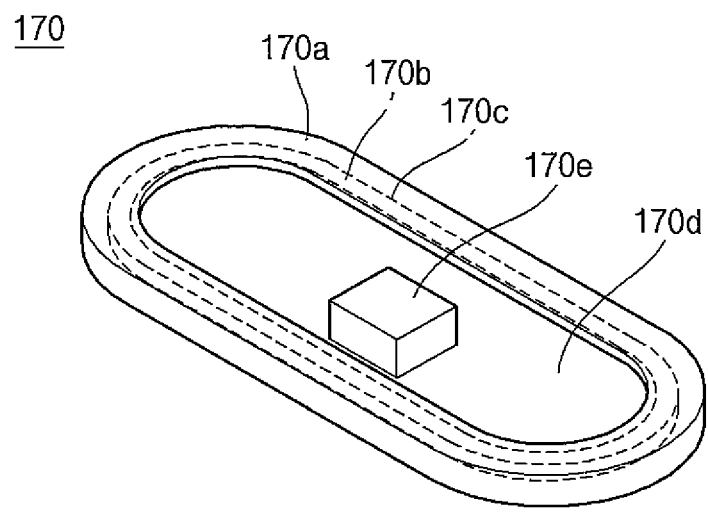
FIG. 3 illustrates a perspective view of a safety vent according to one or more exemplary embodiments.
Figure 4:
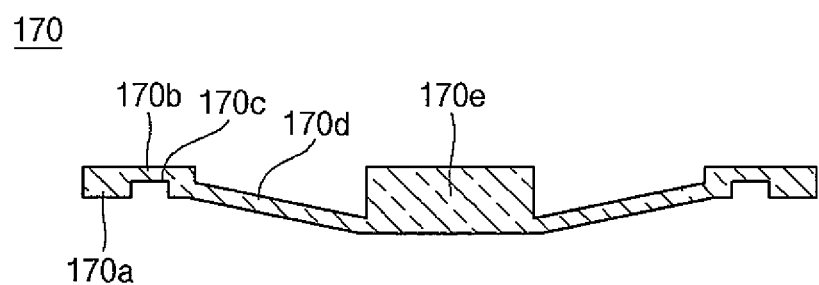
FIG. 4 illustrates a cross-sectional view of the safety vent of FIG. 3.
Figure 5:
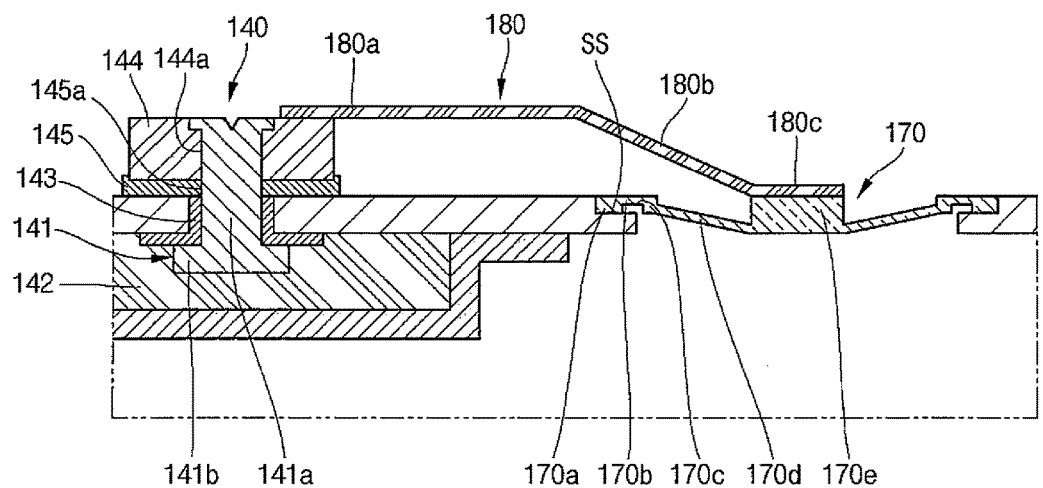
FIG. 5 illustrates an enlarged cross-sectional view of the secondary battery according to one or more exemplary embodiments in a connected state.
Figure 6:
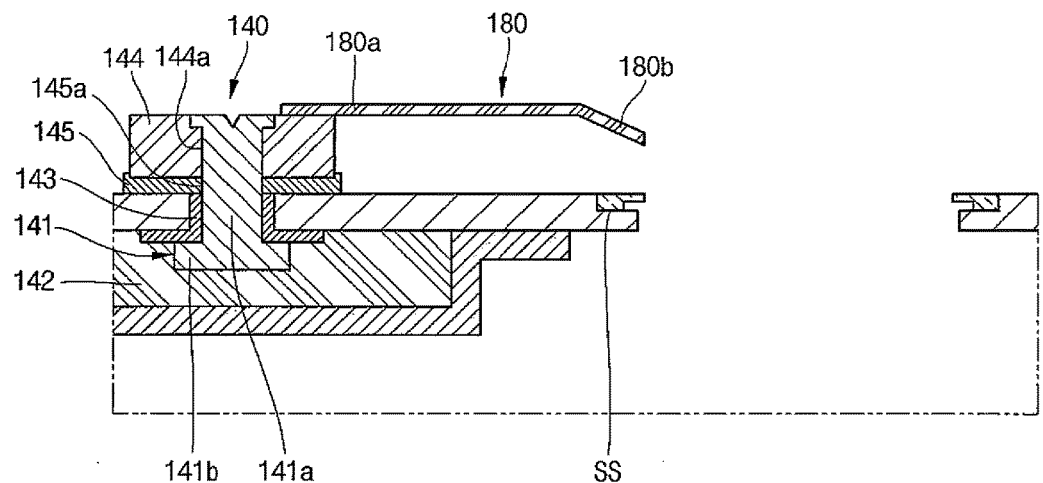
FIG. 6 illustrates an enlarged cross-sectional view of the secondary battery according to one or more exemplary embodiments in a disconnected state.

FIG. 1 illustrates a perspective view of a secondary battery according to one or more exemplary embodiments of the present invention, FIG. 2 illustrates a cross-sectional view of the secondary battery of FIG. 1, FIG. 3 illustrates a perspective view of a safety vent of the secondary battery, FIG. 4 illustrates a cross-sectional view of the safety vent, FIG. 5 illustrates an enlarged cross-sectional view of the secondary battery in a connected state, and FIG. 6 illustrates an enlarged cross-sectional view of the secondary battery in a disconnected state.

Referring to FIGS. 1 and 2, a secondary battery 100 according to one or more exemplary embodiments may include a case 110, an electrode assembly 120, a lead tab 130, a first electrode terminal part 140, a second electrode terminal part 150, a cap plate 160, a safety vent 170, a connector 180, and a plug 190.

The case 110 may have an approximately hexahedral shape with an opening through which the electrode assembly 120 is inserted, and is then sealed. A space, which is for accommodating the electrode assembly 120 and an electrolyte, is defined inside the case 110. The case 110 may be formed of a metal, for example, aluminum or an aluminum alloy. The electrolyte may be, for example, lithium salt molten in an organic solution. The electrolyte may be liquid, solid, or gel, but, the present invention is not limited thereto.

The electrode assembly 120 is inserted into the case 110, and includes a first electrode plate 121, a second electrode plate 122, and a separator 123 between the first and second electrode plates 121 and 122. Also, the electrode assembly 120 is a jelly roll type formed by winding a stack of the first electrode plate 121, the second electrode plate 122, and the separator 123. Also, the first electrode plate 121 may act as a positive electrode, and the second electrode plate 122 may act as a negative electrode having a polarity that is opposite to that of the first electrode plate 121. However, the present invention is not limited thereto. For example, the electrode assembly 120 may have a structure in which a plurality of electrode plates 121 and 122 are alternately stacked. Further, in some embodiments, the first electrode plate 121 may be the negative electrode, and the second electrode plate 122 may be the positive electrode.

The first and second electrode plates 121 and 122 respectively include coating portions 121*a* and 122*a* in which a collector of the metal plate is coated with an active material and non-coating portions 121*b* and 122*b* in which the collector is not coated with the active material and thus is exposed. The non-coating portions 121*b* and 122*b* may be respectively disposed on ends of opposing sides of the first and second electrode plates 121 and 122 to provide a current flow path between each electrode and the outside.

The first electrode plate 121, which acts as the positive electrode, may be formed of a metal foil, such as aluminum, and both surfaces of the coating portion 121a of the first electrode plate 121 may be coated with the active material, which may, for example, include lithium-based oxide as a main component.

The second electrode plate 122, which acts as the negative electrode, may be formed of a metal foil, such as copper, and both surfaces of the coating portion 122a of the second electrode plate 122 may be coated with the active material, which may, for example, include a carbon material as a main component.

The separator 123 may be disposed between the first electrode plate 121 and the second electrode plate 122 to prevent or reduce the likelihood of the first and second electrode plates 121 and 122 short-circuiting. Also, the separator 123 may include polyethylene (PE), polypropylene (PP), or a composite film of polyethylene (PE) and polypropylene (PP).

However, the present invention is not limited to the above materials of the first electrode plate 121, the second electrode plate 122, and the separator 123.

The lead tab 130 may be coupled to the electrode assembly 120, and may include a first lead tab 131 and a second lead tab 132, which are respectively coupled to the electrode plates 121 and 122.

The first lead tab 131 includes a collection part 131a, a connection part 131b, and a contact part 131c. The collection part 131a contacts, and is electrically connected to, the non-coating portion 121b of the first electrode plate 121. The connection part 131b is bent from an upper portion of the collection part 131a and extends along a lower portion of the cap plate 160. The contact part 131c may be disposed in an approximately "⌠" shape at an end of the connection part 131b. An upper portion of the contact part 131c may be electrically connected to, and may contact a bottom surface of, the cap plate 160. Also, the first lead tab 131 may be formed of a metal, such as aluminum or an aluminum alloy. The contact part 131c may be welded to the cap plate 160 through ultrasonic welding, electric welding, or arc welding, for example.

The second lead tab 132 includes a collection part 132a, a connection part 132b, and a contact part 132c. The collection part 132a contacts and is electrically connected to the non-coating portion 122b of the second electrode plate 122. The connection part 132b is bent from an upper portion of the collection part 132a, and extends along the lower portion of the cap plate 160. The contact part 132c further extends from the connection part 132b, and has a second electrode terminal opening (e.g., a second electrode terminal hole) 132d, to which a second electrode terminal 151 is coupled. The second electrode terminal 151 is fitted in, and coupled to, the second electrode terminal hole 132d. Also, the second lead tab 132 may be formed of a metal, such as copper or a copper alloy. However, the present invention is not limited to the above materials of the first and second lead tabs 131 and 132.

The first electrode terminal part 140 may include a first electrode terminal 141, an insulation member 142, a gasket 143, a first coupling terminal 144, and a first coupling plate 145.

The first electrode terminal 141 may include a main body 141a and a flange 141b (see FIG. 6). The main body 141a may have a cylindrical shape, and may pass through the cap plate 160. The flange 141b extends horizontally from a side of a lower portion of the main body 141a. The flange 141b prevents or reduces the likelihood of the first electrode terminal 141 and the cap plate 160 separating.

The insulation member 142 is disposed between each of the first electrode terminal 141 and the cap plate 160 and the first lead tab 131 to prevent or reduce the likelihood of the first electrode terminal 141 from being directly connected to the first lead tab 131.

The gasket 143 is formed of an insulating material, and is disposed between the first electrode terminal 141 and the cap plate 160 to seal a gap between the first electrode terminal 141 and the cap plate 160.

The first coupling terminal 144 may have a plate shape, and may define a first electrode terminal opening (e.g., a first electrode terminal hole) 144a, through which the first electrode terminal 141 passes (see FIG. 6). The first coupling terminal 144 is coupled to the first electrode terminal 141, which protrudes upwardly from the cap plate 160, by riveting or welding, for example. The first coupling terminal 144 may be formed of a metal such as aluminum or an aluminum alloy. Thus, the first electrode terminal 141 is electrically connected to the first coupling terminal 144, and the first coupling terminal 144 is electrically connected to the safety vent 170 and the cap plate 160 through the connector 180.

The first coupling plate 145 defines a first electrode terminal opening (e.g., a first electrode terminal hole) 145a (see FIG. 6), through which the first electrode terminal 141 passes, and that accommodates the first coupling terminal 144. The first electrode terminal 141 is coupled to the first coupling terminal 144 by passing through the terminal plate 145, and is seated on the terminal plate 145. The first coupling plate 145 may be formed of an insulating material (e.g., polypropylene (PP), polyethylene (PE), polyvinyl chloride (PVC), urethane, nylon, and/or TEFLON® (TEFLON® is a registered trademark of the Chemours Company FC, LLC, Wilmington, Del.)). Thus, the first electrode terminal 141 and the first coupling terminal 144 are not directly and electrically connected to the cap plate 160 by the first coupling plate 145. However, the present invention is not limited to the above materials of the first coupling plate 145.

The second electrode terminal part 150 may include the second electrode terminal 151, an insulation member 152, a gasket 153, a second coupling terminal 154, and a second coupling plate 155.

The second electrode terminal 151 may include a main body 151a and a flange 151b. The main body 151a may have a cylindrical shape, and may pass through the cap plate 160. The flange 151b extends horizontally from a side of a lower portion of the main body 151a. The flange 151b prevents or reduces the likelihood of the first electrode terminal 151 and the cap plate 160 separating. A portion of the main body 151a that is connected to a lower portion of the flange 151b is inserted into, and electrically connected through, the second electrode terminal hole 132d of the second lead tab 132.

The insulation member 152 is disposed between the cap plate 160 and the second lead tab 131 to prevent or reduce the likelihood of an electric short circuit.

The gasket 153 is formed of an insulating material, and is disposed between the second electrode terminal 151 and the cap plate 160 to seal a gap between the second electrode terminal 151 and the cap plate 160.

The second coupling terminal 154 may have a plate shape, and may define a second electrode terminal opening (e.g., a second electrode terminal hole) 154a, through which the second electrode terminal 151 passes. The second coupling terminal 154 is coupled to the second electrode terminal 151, which protrudes upwardly from the cap plate 160 through riveting or welding. The second coupling terminal 154 may be formed of a metal such as copper or a copper alloy. Thus, the second electrode terminal 151 is electrically connected to the second coupling terminal 154.

The second coupling plate 155 defines a second electrode terminal opening (e.g., a second electrode terminal hole) 155a, through which the second electrode terminal 151 passes, and that accommodates the second coupling terminal 154. The second electrode terminal 151 is coupled to the second coupling terminal 154 by passing through the terminal plate 155, and is seated on the terminal plate 155. The second coupling plate 155 may be formed of an insulating material (e.g., polypropylene (PP), polyethylene (PE), polyvinyl chloride (PVC), urethane, nylon, and/or TEFLON®). Thus, the second electrode terminal 151 and the second coupling terminal 154 are not electrically connected to the cap plate 160. However, the present invention is not limited to the above materials of the second coupling plate 155.

The cap plate 160 is coupled to the case 110 to seal the opening of the case 110. The cap plate 160 may define first and second electrode terminal openings (e.g., first and second electrode terminal holes) 160a and 160b, which respectively accommodate the main body portions 141a and 151a of the first and second electrode terminals 141 and 151 to allow the first and second electrode terminals 141 and 151 to protrude through the cap plate 160. The cap plate 160 may also include a vent opening (e.g., a vent hole) 160c, and an electrolyte injection opening (e.g., an electrolyte injection hole) 160d.

The vent hole 160c may have a stepped surface SS to which the safety vent 170 is coupled. The safety vent 170 may be relatively thin as compared to the cap plate 160.

The cap plate 160 may be formed of a metal, such as aluminum or an aluminum alloy. Also, because the cap plate 160 contacts and is electrically connected to the first lead tab 131, the cap plate 160 may have the same polarity as the first electrode plate 111. However, the present invention is not limited thereto.

Referring to FIGS. 3 to 5, the safety vent 170 is coupled to the stepped surface SS of the vent hole 160c to seal the vent hole 160c. The safety vent 170 may be ruptured to open the vent hole 160c when an inner pressure of the secondary battery 100 reaches a preset rupture pressure due to overcharging or overdischarging, thereby preventing an explosion from occurring, or reducing the likelihood thereof.

The safety vent 170 may include a fixed part 170a, a rupture part 170b, a notch 170c, a connection part 170d, and a coupling part 170e.

The fixed part 170a may be coupled to the stepped surface SS of the vent hole 160c.

The rupture part 170b is disposed inside the fixed part 170a. When the safety vent 170 is ruptured, flow of current should be broken (or stopped). Thus, the notch 170c may be disposed on a bottom surface of the rupture part 170b. The rupture pressure of the safety vent 170 may be set according to a thickness and shape of the rupture part 170b and according to a recessed degree of the connection part 170d.

The connection part 170d connects the rupture part 170b to the coupling part 170e. Also, the connection part 170d may have a concave shape in which a lower surface (or a bottom surface) of the coupling part 170e is relatively recessed (or inwardly protruded) toward the inside of the case 110 as compared to other portions of the safety vent 170. When the safety vent 170 is ruptured, the recessed shape of the connection part 170d and the coupling part 170e may be reversed.

The coupling part 170e is disposed at or near a center of the safety vent 170. The coupling part 170e may be coupled to the connector 180. For example, the coupling part 170e has a sufficient thickness such that the connector 180 may be welded and coupled to the coupling part 170e. Thus, the coupling part 170e may be relatively thick as compared to the connection part 170d and the rupture part 170b.

In some embodiments, the safety vent 170 may be formed of the same material as the cap plate 160. Also, the safety vent 170 is electrically coupled to the cap plate 160 at the vent hole 160c.

Referring to FIGS. 5 and 6, the connector 180 is connected between the first electrode terminal part 140 and the safety vent 170 to electrically connect the first electrode terminal part 140 to the safety vent 170. The connector 180 may include a terminal contact part 180a, a connection part 180b, and a vent contact part 180c.

The terminal contact part 180a has an approximately rectangular plate shape. The terminal contact part 180a has a first end that is electrically connected to, and contacts, the first coupling terminal 144 of the first electrode terminal part 140. The connection part 180b extends from a second (or opposite) end of the terminal contact part 180a to a position of the coupling part 170e of the safety vent 170, which has a height that is different from that of the terminal contact part 180a. The vent contact part 180c extends from an end of the extending connection part 180b and is electrically connected to and contacts the coupling part 170e of the safety vent 170. The connector 180 may be formed of a metal, such as aluminum or an aluminum alloy. Thus, the first coupling terminal 144 is electrically connected to the safety vent 170 and the cap plate 160 through the connector 180, and the cap plate 160 is connected to the first lead tab 131. Further, the first lead tab 131 is electrically connected to the non-coating portion 121b of the first electrode plate 121. The vent contact part 180c and the coupling part 170e of the safety vent 170 may be welded through ultrasonic welding, electric welding, and/or arc welding. However, the present invention is not limited to the above material of the connector 180.

Referring to FIG. 6, when the inner pressure of the secondary battery 100 reaches the rupture pressure (e.g., the preset rupture pressure), the safety vent 170 is ruptured to open the vent hole 160c. In more detail, the rupture part 170b of the safety vent 170 may rupture because the rupture part 170b is relatively thinner than other portions of the safety vent 170, which may allow the notch 170c, that is disposed on the rupture part 170b, to be deformed or torn. Also, when the safety vent 170 is ruptured, the connector 180 that is coupled to the safety vent 170 may also be ruptured. Thus, when the rupture part 170b is ruptured, the electrical connection between the cap plate 160 and the safety vent 170, and the connection between the safety vent 170 and the first coupling plate 144, may be disconnected. Thus, the electrical connection between the first coupling plate 144 and the cap plate 160 may be disconnected. Therefore, the flow of current of the secondary battery 100 may be stopped.

The plug 190 seals the electrolyte injection hole 160d of the cap plate 160.

As described above, in the secondary battery 100 according to one or more exemplary embodiments, the connector 180 may be coupled between the safety vent 170 and the first coupling terminal 144 to break the current when the safety vent 170 is ruptured due to the increase of the inner pressure of the secondary battery 100, thereby preventing or reducing the likelihood of an explosion.

Hereinafter, a battery module 10 including the secondary battery 100 according to one or more exemplary embodiments is described.

Figure 7:
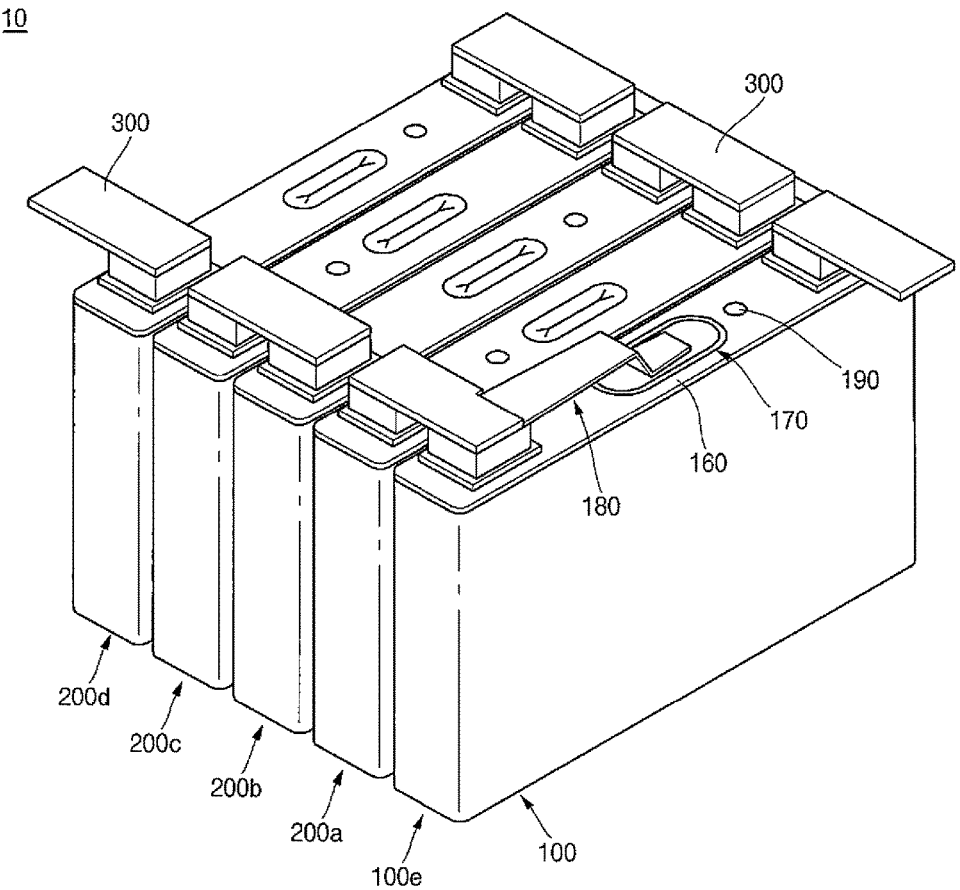
FIG. 7 illustrates a perspective view of a battery module including the secondary battery according to one or more exemplary embodiments.

FIG. 7 illustrates a perspective view of the battery module 10 including the secondary battery 100 according to one or more exemplary embodiments. Referring to FIG. 7, the battery module 10 may include secondary batteries 100, 200*a*, 200*b*, 200*c*, and 200*d* and a bus bar(s) 300.

As illustrated in FIG. 7, in some embodiments, the secondary battery 100 includes the connector 180, and the secondary batteries 200*a*, 200*b*, 200*c*, and 200*d*, each of which has a general structure of a secondary battery, and which do not include the connector 180. The plurality of secondary batteries 100, 200*a*, 200*b*, 200*c*, and 200*d* may be horizontally arranged in a line.

Bus bars 300 respectively electrically connect the secondary batteries 100, 200*a*, 200*b*, 200*c*, and 200*d* to each other. In the present embodiment, the bus bar 300 electrically connects the first coupling terminal 144 having a first polarity (or the second coupling terminal 154) of the secondary battery 100, to a second coupling terminal (or a first coupling terminal) having a second polarity of the secondary battery 200*a* having the general structure. Thus, the plurality of secondary batteries 100, 200*a*, 200*b*, 200*c*, and 200*d* may be connected in series to each other.

When the plurality of secondary batteries 100, 200*a*, 200*b*, 200*c*, and 200*d* are connected in series, when the safety vent 170 and the connector 180 are ruptured due to an increase of an inner pressure of the secondary battery 100, flow of current of the secondary battery 100 may be broken (or stopped). As such flow of current through the whole battery module 10 may be broken (or stopped).

Thus, in the present embodiment, even though the connector 180 is provided in only the secondary battery 100 of the plurality of secondary batteries 100, 200*a*, 200*b*, 200*c*, and 200*d* connected to each other in series, all flow of the current through the plurality of secondary batteries 100, 200*a*, 200*b*, 200*c*, and 200*d* may be broken (or stopped).

In the second battery 100 according to one or more embodiments of the present invention, ends of the connector 180 for breaking (or inhibiting) current may be fixed to the first electrode terminal part 140 and the safety vent 170, which are exposed to the outside of the case 110, to form the current path. Therefore, when the inner pressure of the secondary battery 100 increases such that the safety vent 170 ruptures, the current may be broken to prevent or reduce the likelihood of the secondary battery 100 exploding.

The above-mentioned disclosure is merely directed to embodiments of the secondary battery, and thus, the present invention is not limited thereto. Further, it will be understood by those of ordinary skill in the art that various changes in form and details may be made therein without departing from the spirit and scope of the present invention as defined by the following claims and their equivalents.

What is claimed is:

1. A secondary battery comprising:
  a case defining an inner space;
  an electrode assembly in the case, the electrode assembly comprising:
    a first electrode plate;
    a second electrode plate; and
    a separator between the first and second electrode plates;
  a cap plate sealing the case and electrically connected to the first electrode plate of the electrode assembly, the cap plate comprising a safety vent and a vent opening, the safety vent being coupled to the cap plate at the vent opening to seal the vent opening, the safety vent being electrically connected to the cap plate;
  an electrode terminal part extending through the cap plate; and
  a connector having a first end electrically connected to the electrode terminal part and a second end electrically connected to the safety vent,
  wherein the safety vent comprises:
    a fixed part fixed to the cap plate at the vent opening;
    a rupture part inside the fixed part and defining a notch;
    a coupling part inside the rupture part, and electrically coupled to the second end of the connector; and
    a connection part connecting the coupling part to the rupture part, wherein the connection part has a concave shape in which a lower surface of the coupling part protrudes inwardly toward the inside of the case,
  wherein the coupling part has a thickness that is greater than thicknesses of the fixed part, the rupture part, and the connection part.

2. The secondary battery of claim 1, further comprising a lead tab electrically connected to the electrode assembly, and electrically connecting the cap plate to the first electrode plate.

3. The secondary battery of claim 2, wherein the lead tab comprises:
  a collection part contacting the first electrode plate;
  an extension part extending from an upper portion of the collection part; and
  a contact part at an end of the extension part.

4. The secondary battery of claim 2, wherein the electrode terminal part comprises:
  a coupling terminal;
  an electrode terminal extending through the cap plate and through the coupling terminal, and electrically coupled to the coupling terminal; and
  a coupling plate electrically insulating the coupling terminal from the cap plate.

5. The secondary battery of claim 4, further comprising an insulation member between the cap plate and the lead tab.

6. The secondary battery of claim 1, wherein the vent opening is defined by a stepped surface of the cap plate, and wherein the fixed part is coupled to the stepped surface.

* * * * *